(12) United States Patent
Kato

(10) Patent No.: US 6,569,054 B2
(45) Date of Patent: May 27, 2003

(54) PARALLEL HYBRID VEHICLE

(75) Inventor: Yoshiaki Kato, Fujisawa (JP)

(73) Assignee: Jatco Transtechnology, Ltd., Fuji (JP)

( * ) Notice: Subject to any disclaimer, the term of this patent is extended or adjusted under 35 U.S.C. 154(b) by 0 days.

(21) Appl. No.: 09/826,835

(22) Filed: Apr. 6, 2001

(65) Prior Publication Data

US 2001/0029220 A1 Oct. 11, 2001

(30) Foreign Application Priority Data

Apr. 6, 2000 (JP) ........................................ 2000-105327

(51) Int. Cl.$^7$ ........................ B60K 41/02; B60K 41/22; F16H 3/72; F16H 37/06; F16D 27/08
(52) U.S. Cl. ................. 477/5; 477/6; 477/13; 475/5; 180/65.2; 192/3.52; 192/48.2
(58) Field of Search ................ 477/5, 6, 13, 174, 477/179; 475/2, 5, 149; 180/65.2, 65.3; 192/3.52, 3.56, 48.2, 53.2

(56) References Cited

U.S. PATENT DOCUMENTS

| | | | | |
|---|---|---|---|---|
| 5,433,282 A | * | 7/1995 | Moroto et al. | 180/65.2 |
| 5,846,155 A | * | 12/1998 | Taniguchi et al. | 180/65.2 |
| 6,041,879 A | * | 3/2000 | Itoh et al. | 180/247 |
| 6,054,776 A | | 4/2000 | Sumi | 290/17 |
| 6,142,907 A | | 11/2000 | Minowa et al. | |
| 6,184,603 B1 | * | 2/2001 | Hamai et al. | 180/65.2 |
| 2001/0020789 A1 | * | 9/2001 | Nakashima | |
| 2002/0050259 A1 | * | 10/2001 | Kojima | |
| 2002/0007974 A1 | * | 1/2002 | Nagano et al. | |

FOREIGN PATENT DOCUMENTS

| | | |
|---|---|---|
| EP | 1 083 319 A1 | 3/2001 |
| JP | 409109705 * | 4/1997 |
| JP | 10-304513 | 11/1998 |
| JP | 11-313404 A | 11/1999 |
| KR | 1999-0083546 A | 11/1999 |

\* cited by examiner

Primary Examiner—Sherry Estremsky
Assistant Examiner—Tisha D. Lewis
(74) Attorney, Agent, or Firm—Foley & Lardner

(57) ABSTRACT

A parallel hybrid vehicle can achieve regeneration efficiency in a regenerating operation by employing an electromagnetic two-way clutch which is superior in engaging and disengaging, can shorten a length in axial direction and can provide great freedom in layout. The parallel hybrid vehicle includes an engine, a motor generator having both functions of a generator and a motor, a transmission, a torque combining mechanism combining an output torque of the engine and an output torque of the motor generator by a planetary gear mechanism for outputting torque, control means for controlling output torque of the motor generator and rotating condition, and an electromagnetic two-way clutch mechanism selectively controlling engaging and disengaging between respective elements of the planetary gear mechanism.

10 Claims, 10 Drawing Sheets

PARALLEL HYBRID VEHICLE

BACKGROUND OF THE INVENTION

1. Field of the Invention

The present invention relates to a parallel hybrid vehicle in which an engine, and an electric motor serving also as a generator are provided and output torques of the engine and the motor are transmitted to a transmission through a torque combining mechanism constituted of a planetary gear mechanism to produce a running driving force from one or both of the engine and the motor.

2. Description of the Related Art

One of the conventional parallel hybrid vehicle has been disclosed in Japanese Patent Application Laid-Open No. Heisei 10-304513 (corresponding to U.S. Pat. No. 6,054,776). Disclosed in the above-identified publication combines an output torque of an engine and an output torque of an electric motor are combined by a torque combining mechanism constituted of a planetary gear mechanism to transmit the combined torque to a driving wheel via a transmission. In the parallel hybrid vehicle, for example, upon acceleration from standstill condition, a motor generator having large torque at low speed range is used as a motor, subsequently, the output torque of the motor generator and the output torque of the engine are combined, and at further high speed region, the motor generator is turned off to drive only with the output torque of the engine. In such parallel hybrid vehicle, when the motor speed of the motor generator reaches an engine speed, both, more particularly respective elements of the planetary gear mechanism connected to both are directly connected by a direct connection clutch to enhance response characteristics of output torque control. On the other hand, upon deceleration state of the vehicle, the motor generator is driven by a reaction torque input from a road surface to operate the motor generator as a power generator to accumulate electric power. Such operation is referred to as regeneration. In this case, when the engine and the motor generator are directly connected, regeneration efficiency is lowered by engine braking effect. Therefore, the direct connection clutch may be disengaged. Conventionally, the direction connection clutch is typically constructed by a hydraulic clutch.

However, the hydraulic clutch to be used as the direct connection clutch in the conventional parallel hybrid vehicle is not high in response characteristics in engaging and disengaging. Therefore, in the case that the direct connection is disengaged when the motor generator is regenerated, it may be taken a time for disengaging the direct connection clutch, and energy may not be collected until regenerating operation is initiated to lower regeneration efficiency. On the other hand, the hydraulic clutch is required to arrange a plurality of friction plates in axial direction, for example, to make it impossible to shorten the length in the axial direction. Also, the hydraulic clutch is restricted significantly in layout since the hydraulic path for actuating the piston and so forth has to be formed.

SUMMARY OF THE INVENTION

The present invention has worked out in view of the problems set forth above. It is therefore an object of the present invention to provide a parallel hybrid vehicle which can improve regeneration efficiency upon regenerating operation by employing an electromagnetic two-way clutch which is superior in engaging and disengaging, can shorten a length in axial direction and can provide great freedom in layout.

According to one aspect of the present invention, a parallel hybrid vehicle comprises:

an engine;

a motor generator having both functions of a generator and a motor;

a transmission;

a torque combining mechanism combining an output torque of the engine and an output torque of the motor generator by a planetary gear mechanism for outputting torque;

control means for controlling output torque of the motor generator and rotating condition; and an electromagnetic two-way clutch mechanism selectively controlling engaging and disengaging of between respective elements of the planetary gear mechanism.

The electromagnetic two-way clutch is formed with the inner ring and the outer ring arranged across the rolling element, such as the roller, and one of rolling contact surfaces mating is formed as cam face, and the other rolling contact surface is formed as cylindrical surface. The electromagnet is energized for integrating one of the inner ring and the outer ring carrying the cam face and a cage. Then, the rolling element is engaged between the cam face and the cylindrical surface of the inner and outer rings for integral rotation of the inner and outer rings. On the other hand, when the electromagnet is deenergized, namely turned off, the cage is integrally rotated with one of the inner and outer rings carrying the cam face to place the rolling element at the neutral position between the cam face and the cylindrical surface and whereby to permit relative rotation of the inner and outer rings. Namely, when the rolling element is engaged between the cam face and cylindrical surface to integrate the inner ring and the outer ring, the electromagnetic two-way clutch is engaged, and when the rolling element is integrated one of the inner and outer rings carrying the cam face to permit relative rotation of the other inner and outer rings, the electromagnetic two-way clutch is disengaged.

The planetary gear mechanism of the torque combining mechanism and the motor generator may be separated by a partitioning wall coupled with the transmission, the partitioning wall being reduced in diameter at an end portion on the side of the motor generator, an electromagnet of the electromagnetic two-way clutch is arranged on inside of diameter reduced portion of the partitioning wall.

A sun gear of the planetary gear mechanism of the torque combining mechanism may be connected to the motor generator, a ring gear is connected to the engine, a pinion carrier is connected to the transmission, and the sun gear and the pinion carrier of the planetary gear mechanism is engaged and disengaged by the electromagnetic two-way clutch.

When the electromagnetic two-way clutch is shifted from engaged position to disengaged position, the control means deenergize the electromagnet of the electromagnetic two-way clutch and controls an output torque of the motor generator so that revolution speed of the motor generator becomes higher than revolution speed of the engine.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be described hereinafter in detail in terms of the preferred embodiment of a parallel hybrid vehicle according to the present invention with reference to the accompanying drawings. In the following description, numerous specific details are set forth in order to provide a thorough understanding of the present invention. It will be obvious, however, to those skilled in the art that the present invention may be practiced without these specific detailed. In the other instance, well known structure are not shown in detail in order to avoid unnecessary obscurity of the present invention.

Figure 1:
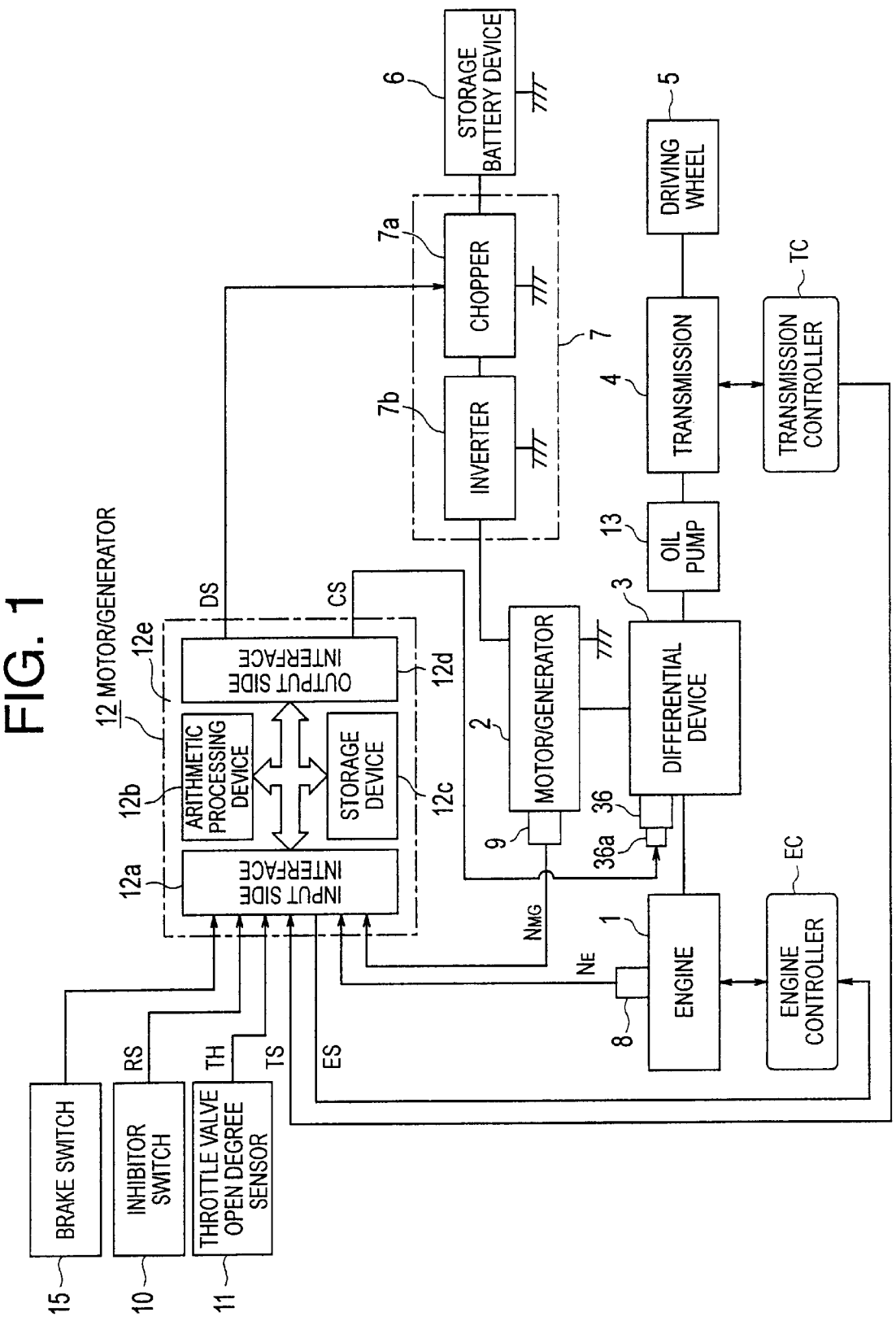
FIG. 1 is an illustration showing a general construction showing one embodiment of a parallel hybrid vehicle according to the present invention.

FIG. 1 is a schematic block diagram showing an embodiment of the present invention, and output sides of an engine 1 and an AC type motor/generator 2 constituted by a three-phase induction motor/generator as an electric rotary driving source operating as a generator or a motor are respectively connected to an input side of a differential device 3, and at an output side of this differential device 3 is connected to an input side of a transmission 4 which has no starting device such as a torque converter mounted thereon. An output side of the transmission 4 is connected to a driving wheel 5 through a final reduction device not shown. In the shown embodiment, an oil pump 13 is arranged between the differential device 3 and the transmission 4. The oil pump 13 generates a fluid pressure to be used for controlling the transmission 4. It should be appreciated that the oil pump may also be driven by a dedicated drive motor.

Figure 2:
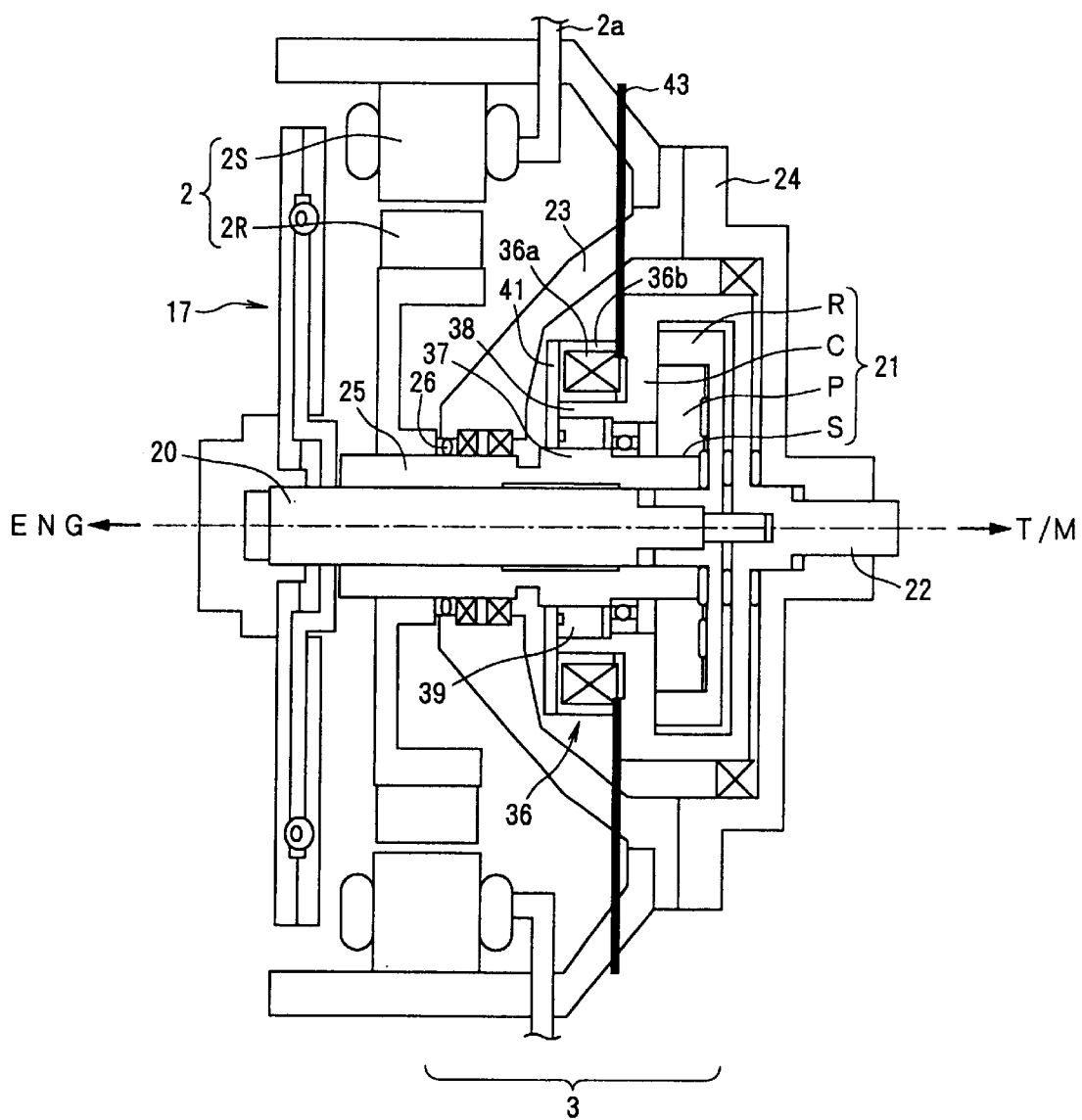
FIG. 2 is an illustration showing one example of a differential device employed in the parallel hybrid vehicle of FIG. 1.

The engine 1 is controlled by an engine controller EC, and the motor/generator 2 includes a stator 2S and a rotor 2R shown in FIG. 2, for example, and is controlled by a motor/generator driving circuit 7 connected to a storage battery device 6 constituted by a battery or a capacitor which can be charged.

The motor/generator driving circuit 7 is constructed with a chopper 7a connected to the storage battery device 6, and an inverter 7b connected between the chopper 7a and the motor/generator 2 and including, for example, six thyristors for converting a DC to a three-phase AC. The chopper 7a is supplied with a duty control signal DS from a motor/generator controller 12 which will be discussed later. The chopper 7a also delivers a chopper signal having a duty ratio corresponding to the duty control signal DS to the inverter 7b. The inverter 7b controls the motor/generator 2 on the basis of a rotary position detecting signal of a position sensor (not shown) which detects a rotary position of the rotor of the motor/generator 2 in which a gate control signal of each thyristor of the inverter 7b is formed so that the inverter 7b produces the three-phase AC for driving the motor/generator 2 at a frequency synchronized with the rotation such that the motor/generator 2 is operated as a motor during forward rotation, and operated as a generator during reverse rotation. Throughout the disclosure and claims, it is defined that a rotating or revolution direction for driving the vehicle in forward direction is forward rotating or revolution direction and a rotating or revolution direction opposite to the forward direction is reverse rotating or revolution direction.

Figure 3:
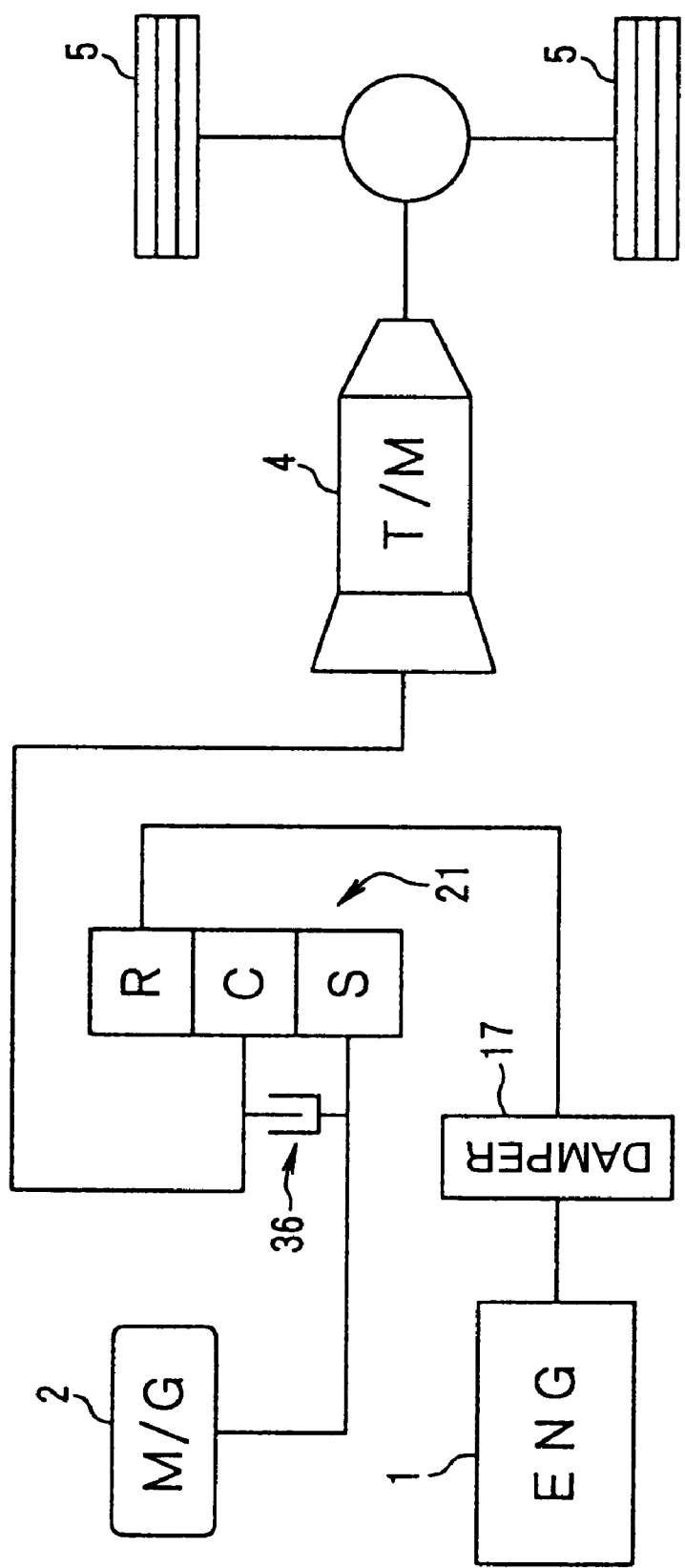
FIG. 3 is a diagrammatic illustration of the parallel hybrid vehicle of FIG. 1.

The differential device 3 includes, as shown in FIGS. 2 and 3, a planetary gear mechanism 21 serving as a torque combining mechanism. The planetary gear mechanism 21 is cooperated with the engine 1 for performing a function as the torque combining mechanism with perform differential function between the engine 1 and the motor/generator. The planetary gear mechanism 21 has a sun gear S, a plurality of pinions P engaging the sun gear S at an outer peripheral side at equiangular intervals, a pinion carrier C supporting each pinion P, and a ring gear R engaging at an outer side of the pinions P. The ring gear R is connected to an output shaft of the engine 1 through the drive shaft 20. The sun gear S is connected to an output shaft connected to the rotor 2R of the motor/generator 2. The pinion carrier C is connected to an input side of the transmission 4 (T/M in the drawing) through an input shaft 22.

The motor/generator 2 and the planetary gear mechanism 21 are isolated with each other by a partitioning wall 23 coupled with a transmission casing 24. The reason is that the motor/generator 2 is to be used in a dry chamber and the planetary gear mechanism 21 is to be used in a wet chamber. Between a cylindrical portion 25 connecting the sun gear S and the motor/generator 2 and the partitioning wall 23, a seal member 26 is disposed. The partitioning wall 23 is gradually reduced a diameter thereof toward the seal member 26, namely toward the motor/generator 2. In a cavity defined by the diameter reducing portion of the partitioning wall 23, an electromagnetic two-way clutch 36 is provided. The electromagnetic two-way clutch 36 is constructed with an inner ring 37 formed between the sun gear S of the planetary gear mechanism 21 and the cylindrical portion 25, an outer ring 38 extended from the pinion carrier C, a rotor 36b fixed to the outer periphery of the outer ring 38, a plurality of rollers 39 disposed between the inner ring 37 and the outer ring 38 as rolling element, a cage 40 (see FIG. 4) for holding the rollers 39, an armature 41 connected to the cage 40 for sliding in axial direction but being prevented from causing angular displacement relative to the cage and extending outside of the outer ring 38, and an electromagnet 36a located outside position of the outer ring 38 and permitted angular displacement relative to the rotor 36b.

Figure 4:
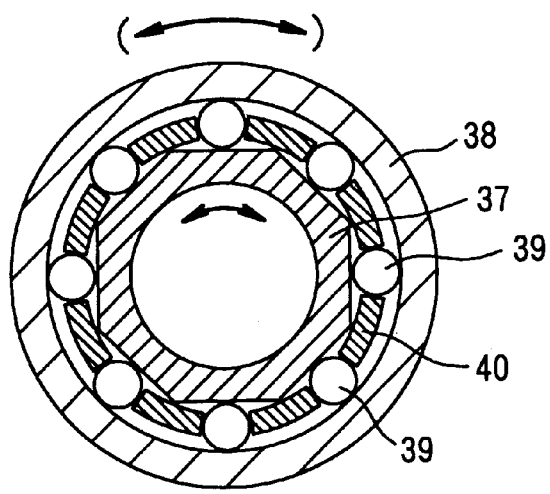
FIG. 4 is an explanatory illustration of an operation of an electromagnetic two-way clutch employed in the differential device of FIG. 2.
Figure 5:
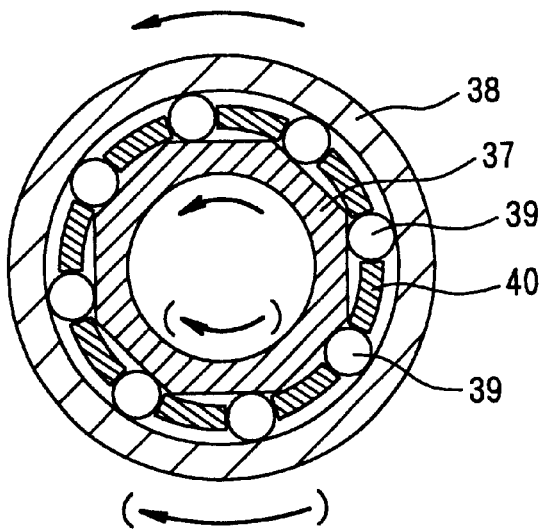
FIG. 5 is an explanatory illustration of an operation of an electromagnetic two-way clutch employed in the differential device of FIG. 2.

In the electromagnetic two-way clutch 36, the inner peripheral surface of the outer ring 38 is a cylindrical surface whereas the outer peripheral surface of the inner ring 37 has an octagonal section so that each plane forming the octagonal section serves as a cam face. In the electromagnetic two-way clutch 36 constructed as set forth above, when the electromagnet 36a is in off position, namely non-excited condition, the cage 40 is placed by a not shown spring to place the roller 39 at the neutral position at the center relative to the cam faces as shown in FIG. 4, to form a clearance between the roller 39 and the outer ring 38 to permit free rotation of the outer ring 38 and the inner ring 37. On the other hand, when the electromagnetic 36a is turned on, namely into excited state, the rotor 36b is urged onto the armature 41 by a magnetic force to fix the rotational direction of the outer ring 38 and cage 40. By this, as shown in FIG. 5, the roller 39 is inclined toward one of wedge space by the cage 40 to engage between the cylindrical surface of the outer ring 38 and the cam surface of the inner ring 37 to cause integral rotation of the inner ring 37, the outer ring 38 and the roller 39. Furthermore, when the roller 39 engages between the cylindrical surface of the outer ring 38 and the cam surface of the inner ring 37, it cannot be released easily for wedge effect. As a result, it becomes possible to integrally rotate even in the reverse direction.

Since the electromagnet of the electromagnetic two-way clutch 36 is arranged within the cavity defined by the diameter reducing portion of the partitioning wall 23, a power supply line 43 of the electromagnet 36a is located in the vicinity of the power supply line 2a of the motor/generator 2 to facilitate wiring. On the other hand, as set forth above, since the electromagnetic two-way clutch 36 is not required to arrange the friction plate in the axial direction, the electromagnetic two-way clutch 36 can be arranged close to the motor/generator 2 by arranging within the cavity of the partitioning wall 23 to permit further shortening the length in the axial direction. Furthermore, in the shown embodiment, the inner ring 37 is formed integrally with the sun gear S of the planetary gear mechanism 21 and the outer ring 38 is formed integrally with the pinion carrier C, and the inner ring 37 and the outer ring 38 are engaged and disengaged by the roller 39. Therefore, the electromagnetic two-way clutch 36 per se can be placed close to the planetary gear mechanism 21. This also contribute for shortening the length in the axial direction.

It should be noted that when the electromagnetic two-way clutch control signal CS for the electromagnet 36a of the electromagnetic two-way clutch 36 is high level, the electromagnet 36a is energized and placed in ON state, and when the electromagnetic two-way clutch control signal CS is low level, the electromagnet 36a becomes deenergized and placed in OFF state. On the other hand, the electromagnetic two-way clutch control signal CS is adjustable between the low level and the high level in continuous manner (digitized in practice).

On the other hand, in the shown embodiment, in order to restrict combustion vibration in the engine 1, the shown embodiment disposes a damper 17 on output side of the engine 1.

Also, the transmission 4 is controlled to transmission speed ratios at first to fourth speed ranges, for example as determined through looking up of a preliminarily set transmission control map in terms of a vehicle speed and a throttle valve open degree by a transmission controller TC. The transmission 4 is mutually communicated with the motor/generator controller 12.

On the other hand, in the engine 1 and the motor/generator 2, an engine speed sensor 8 for detecting rotation speed of respective output shafts and a motor/generator speed sensor 9 are provided. Also, an inhibitor switch 10 outputting a range signal detecting upon a range position of a not shown selector lever, a throttle valve open degree sensor 11 detecting a throttle valve open degree depending upon depression magnitude of the accelerator pedal and a brake switch 15 detecting depression of a brake pedal are provided. An engine speed detection value $N_E$ of the engine speed sensor 8, a motor/generator speed detection value $N_{M/G}$ of the motor/generator speed sensor 9, a range signal RS of the inhibitor switch 10, a throttle valve open degree detection value TH of the throttle valve open degree sensor 11 and brake pedal depressing condition of the brake switch 15 are supplied to the motor/generator controller 12 for controlling the motor/generator 2 and the electromagnetic two-way clutch 36. The motor/generator controller 12 is constructed to communicate with the transmission controller TC with each other to receive information of gear ratio (transmission speed ratio) of the transmission 4 as the transmission signal TS. On the other hand, the motor/generator controller 12 also communicate with the engine controller EC. For example, information of combustion condition or so forth of the engine is received as an engine signal ES. It should be noted that the motor/generator speed sensor 9 may also detect forward and reverse revolution of the motor/generator 2.

The motor/generator controller 12 is constructed with a microcomputer 12e which includes at least an input side interface 12a, an arithmetic processing device 12b, a storage device 12c and an output side interface circuit 12d.

To the input side interface circuit 12a, the engine speed detection value $N_E$ of the engine speed sensor 8, the motor/generator speed detection value $N_{M/G}$ of the motor/generator speed sensor 9, the range signal RS of the inhibitor switch 10, the throttle valve open degree detection value TH of the throttle valve open degree sensor 11, the brake pedal depressing condition of the brake switch 15, the engine signal ES of the engine controller EC and transmission signal TS of the transmission controller TC are input.

The arithmetic processing device 12b becomes active state in response to turning on of power supply by turning on of a key switch (not shown), for example. At first, initialization is performed to turn off the driving duty control signal MS and generating duty control signal GS for the motor/generator 2, and also turn off a clutch control signal CS of the electromagnetic two-way clutch 36. Subsequently, upon acceleration in standstill condition or during deceleration, the motor/generator 2 and the electromagnetic two-way clutch 36 are controlled on the basis of the engine speed detection value $N_E$, the generator/generator speed detection value $N_{M/G}$, the range signal RS and the throttle valve open degree detection value TH.

The storage device 12c preliminarily stores programs necessary for the arithmetic operation of the arithmetic processing device 12b and also stores various data necessary for arithmetic process of the arithmetic processing device 12b.

The output side interface circuit 12d supplies the driving duty control signal MS, the generating duty control signal GS and the electromagnetic two-way clutch control signal CS as the result of arithmetic operation by the arithmetic processing device 12b to the motor/generator drive circuit 7 and the electromagnet 36a. In the motor/generator 2, it is also possible to apply braking force for the vehicle utilizing a counter electromotive force. A braking torque increasing control of the motor/generator 2 increases a braking torque by increasing the counter electromotive force generated by applying large duty ratio of the duty control signal DS to be supplied to a chopper 7a of the motor/generator drive circuit 7 when the motor/generator 2 is operated as generator. On the other hand, when the motor/generator 2 is operated as motor, the duty ratio of the duty control signal DS is set small to reduce drive torque to increase brake torque. On the other hand, braking torque reducing control of the motor/generator 2 is, conversely to the above, when the motor/generator 2 operates as the generator, the duty ratio of the duty control signal DS is made small to reduce the counter electromotive force to reduce the brake torque, and when the motor/generator 2 operates as the motor, the duty ratio of the duty control signal DS is made large to increase drive torque to reduce the braking torque.

Next, among various arithmetic process to be performed in the motor/generator controller 12, arithmetic operation to be performed during deceleration of the vehicle will be discussed with reference to the flowchart of FIG. 6. The arithmetic process is performed by timer interrupt per a predetermined control period $\Delta T$ by the arithmetic processing device 12b in the motor/generator 12. On the other hand, while not communication step is provided in the shown flowchart, necessary information or program is externally input or read out from the storage device 12c through the input interface 12a from time to time, and information on arithmetic operation is stored in the storage device 12c from time to time.

In the arithmetic operation, at first, at step S1, according to individual arithmetic operation executed in the step, the throttle valve open degree TH detected by the throttle valve open degree sensor 11, the brake pedal depressing condition of the brake switch 15, the range signal RS of the inhibitor switch 10, the engine speed $N_E$ detected by the engine speed sensor 8 and the motor/generator speed $N_{M/G}$ detected by the motor/generator speed sensor 9 are read out.

Then, the process is advanced to step S2 to read out a vehicle speed $V_{SP}$ and a current transmission speed ratio (transmission speed range) are read out from the transmission controller TC according to each individual arithmetic process to be executed in the step.

Then, the process is advanced to step S3, according to each individual arithmetic process to be executed in the step, check is performed whether the currently executed control is deceleration control as judged at step S6 which will be discussed later, or not. If the currently executed control is deceleration control, the process is advanced to step S4, and otherwise, the process is advanced to step S5.

At step S5, check is performed whether the vehicle is in transition state from driving condition to decelerating condition from the contents, such as throttle valve open degree TH is "0" and the brake pedal is depressed, or the range signal RS represents engine braking range. If the vehicle driving move is transit to the decelerating condition, the process is advanced to step S6, and otherwise, the process returns to the main program.

At step S6, according to each individual arithmetic process to be executed in the step, deceleration control is initiated. Then process is advanced to step S7.

On the other hand, at step S4, according to each individual arithmetic process to be executed in the step, check is performed whether the vehicle driving mode is transit from the decelerating condition to the driving condition or not from the content, such as the throttle valve open degree TH is "0" and a vehicle acceleration $G_X$ acts in accelerating direction, the range signal RS represents traveling range other than engine braking range, or brake is not actuated. When the vehicle driving mode is transited to the driving condition, the process is advanced to step S13, and otherwise the process is advanced to step S7.

At step S7, according to each individual arithmetic process to be executed in the step, check is performed whether the motor/generator 2 is currently positive torque controlled at step S10 which will be discussed later. If the motor/generator is currently positive torque controlled, the process is advanced to step S8, and otherwise, the process is advanced to step S9.

At step S9, according to each individual arithmetic process to be executed in the step, the control signal CS of the electromagnetic two-way clutch 36 is turned off condition, namely the electromagnet 36a of the electromagnetic two-way clutch 36 is deenergized. Then, process is advanced to step S10.

At step S10, according to each individual arithmetic process to be executed in the step, control is performed so that the output torque of the motor/generator 2 is directed in forward direction. Then, process is advanced to step S8. Particularly, at this time, torque control for the motor/generator 2 is performed so that the motor/generator speed $N_{M/G}$ is higher than the engine speed $N_E$.

At step S8, check is performed whether the motor/generator speed $N_{M/G}$ as read at step S1 is higher than the engine speed $N_E$. When the motor/generator speed $N_{M/G}$ is higher than the engine speed $N_E$, the process is advanced to step S12, and otherwise the process returns to the main program.

At step S12, according to each individual arithmetic process to be executed in the step, after termination of the positive torque control of the motor/generator 2 performed at step S10, the process is advanced to step S13.

At step S13, after termination of deceleration control as initiated at step S6, the process returns to main program.

Figure 6:
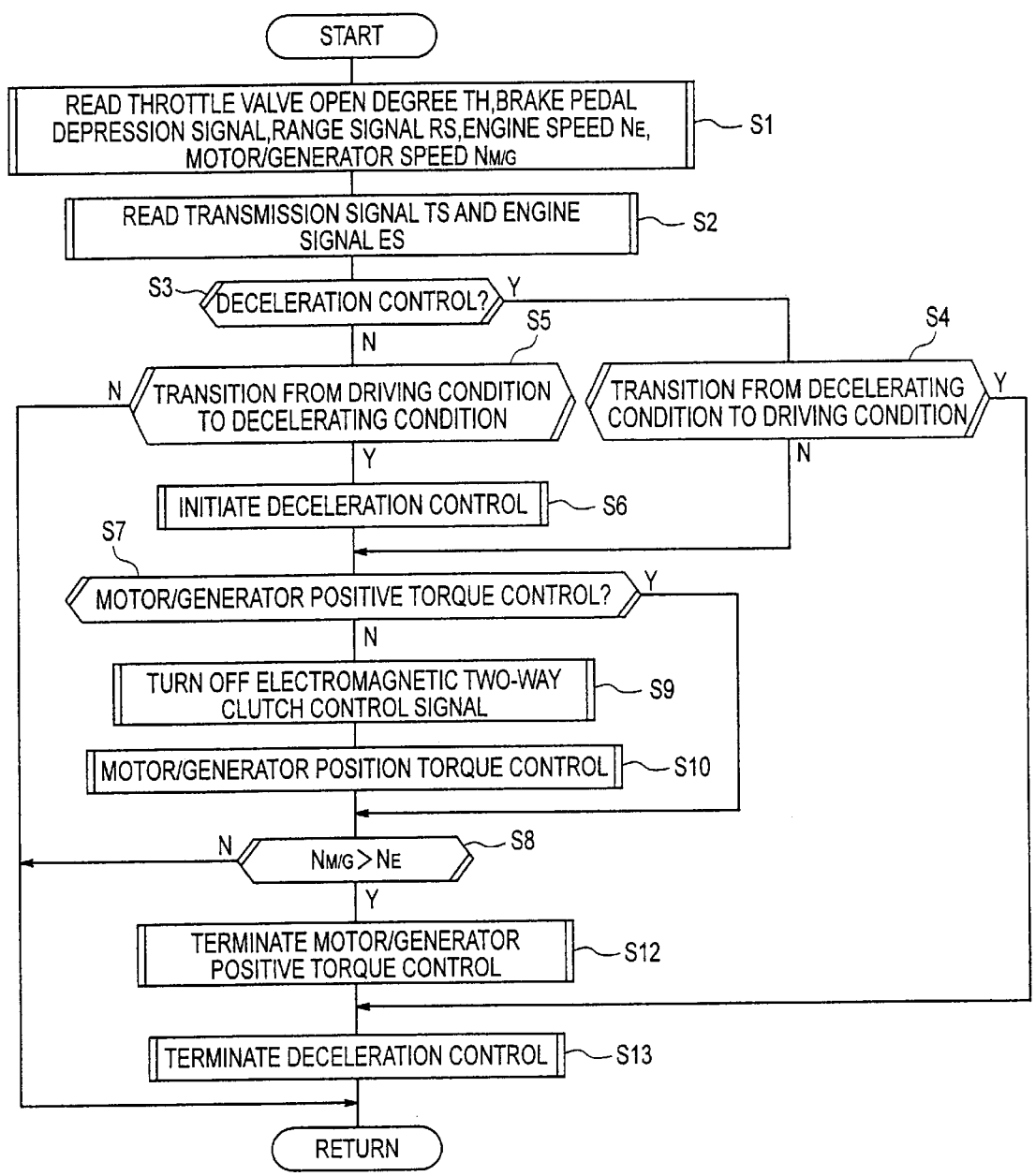
FIG. 6 is a flowchart showing an arithmetic process during deceleration control to be performed in a controller.

With the arithmetic process of FIG. 6, when driving condition of the vehicle is continued, the process from step S3 to return to the main program via step S5 is repeated. However, at the first control timing after transition from driving condition to the decelerating condition of the vehicle, the process is advanced from step S5 to step S6 to initiate deceleration control. Then, at step S7, check is performed whether the motor/generator is positive torque controlled or not. At this time, the motor/generator 2 is not positive torque controlled, the process is advanced to step S9 to turn off the electromagnetic two-way clutch control signal CS. For example, as will be discussed later, when the motor/generator speed $N_{M/G}$ becomes high than the engine speed $N_E$, the motor/generator 2 and the engine 1 are connected directly. Namely, when the electromagnetic two-way clutch control signal CS is on and the motor/generator speed $N_{M/G}$ is lower than or equal to the engine speed $N_E$, such as acceleration from standstill condition, it is possible that the motor/generator 2 and the engine 1 are not directly connected. Then, the electromagnetic two-way clutch control signal CS is turned off.

Next, the process is advanced to step S10 to control the output torque of the motor/generator 2 in forward direction so that the motor/generator speed $N_{M/G}$ becomes higher than the engine speed $N_E$. Accordingly, even when the output torque of the motor/generator 2 is negative before and the roller 39 of the electromagnetic two-way clutch 36 is engaged between the cam face of the inner ring 37 and the cylindrical surface of the outer ring 38 and cannot be disengaged due to wedge effect, since the electromagnet 36a is deenergized at this timing, and accordingly, the cage 40 and the outer ring 38 are not integrated. Therefore, when the output torque of the motor/generator 2 is applied in forward direction, the roller 39 is released from the cam face of the inner ring 37 and the cylindrical surface of the outer ring 38. Then, by means of not shown return spring, the cage 40 is biased to the neutral position where the roller 39 does not engage with the cam face and the cylindrical surface to be held in free condition.

The free condition of the roller 39 of the electromagnetic two-way clutch 36 is judged in that the motor/generator speed $N_{M/G}$ of the motor/generator 2 is slightly higher than the engine speed $N_E$. Therefore, when the motor/generator speed $N_{M/G}$ is judged higher than the engine speed $N_E$ at step S8 of the arithmetic operation of FIG. 6, then at step S12, it becomes unnecessary to control the output torque of the motor/generator 2 to the forward direction. Thus, the motor/generator control is terminated. Then, at S13, after terminating the shown program to be executed at the initial stage upon transition to the decelerating condition, the process is advanced to return to the main program after terminating the shown programs with jumping the process from step S4 to step S13.

Figure 7:
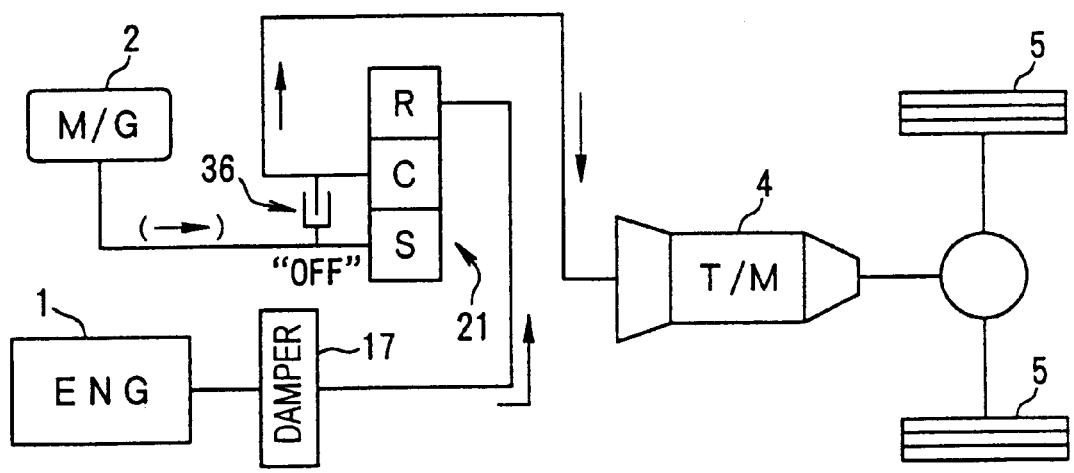
FIG. 7 is a diagrammatic and alignment charts when the parallel hybrid vehicle of FIG. 1 is in driving condition.
Figure 7:
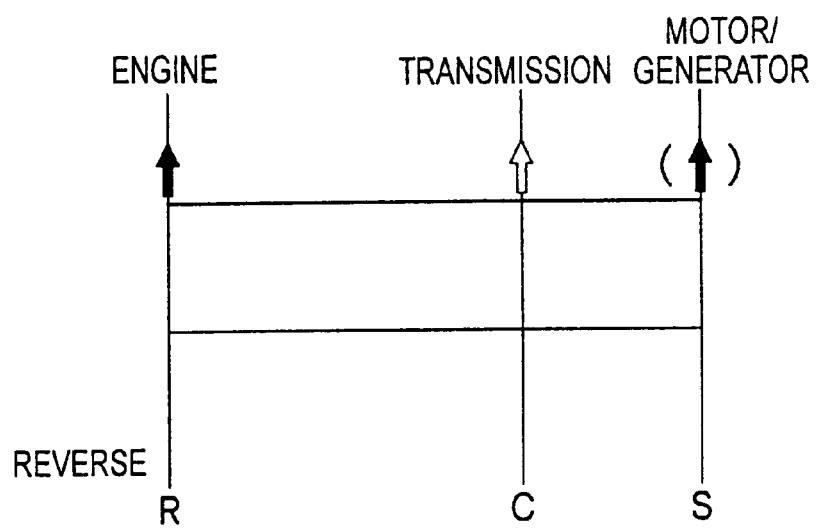

Next, discussion will be given for particular operation of the arithmetic process of FIG. 6. It should be noted that in the drawing, the torque to be input to the planetary gear mechanism (positive torque) is shown by the black solid arrow, and the torque fed out from the planetary gear mechanism 21 (negative torque) is shown by the white outlined arrow. FIG. 7 shows the torque condition of the vehicle in the driving condition. At this time, normally, the electromagnetic two-way clutch control signal CS is held off, the electromagnet 36*a* of the electromagnetic two-way clutch 36 is deenergized condition. Accordingly, the roller 39 of the electromagnetic two-way clutch 36 is engaged between the cam face of the inner ring 37 and the cylindrical surface of the outer ring 38 in the forward direction as shown in FIG. 5. With the wedge effect, the roller will not be disengaged by small engine brake torque or regeneration torque of the motor/generator 2. It should be noted that the electromagnetic two-way clutch 36 is engaged in off condition. Accordingly, in such condition, the output torque of the engine 1 mainly drives the vehicle. Lacking of the output torque as demanded by the driver, for example, of the engine is compensated by the output torque of the motor/generator 2.

Figure 8:
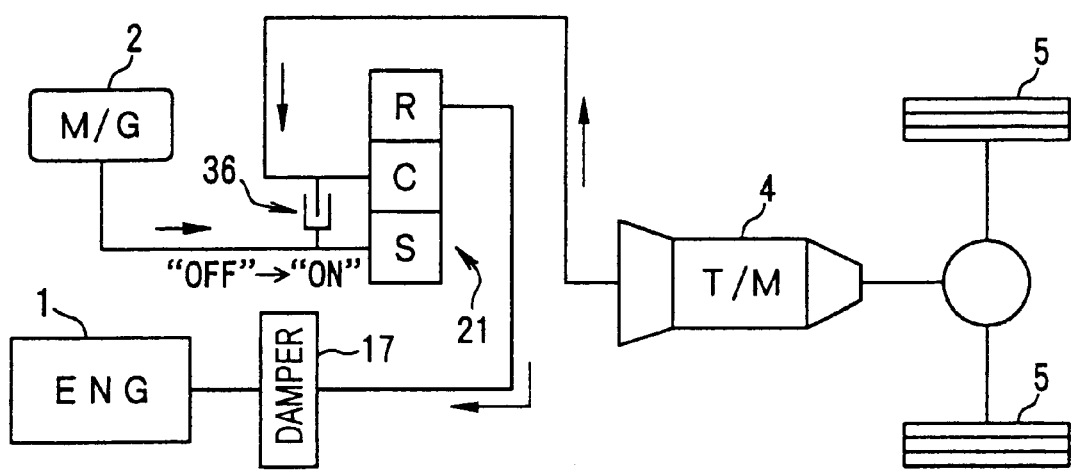
FIG. 8 is a diagrammatic and alignment charts when the parallel hybrid vehicle of FIG. 1 is in transition to decelerating condition.
Figure 8:
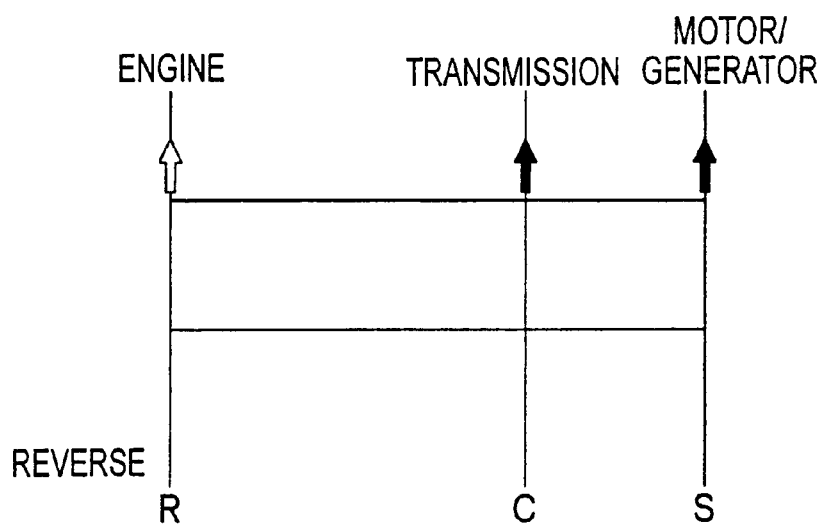

From this condition, if the vehicle driving condition is transited to the deceleration state of the vehicle, backward torque is applied to the engine 1 and the motor/generator 2 by the road surface reaction torque. In such extent of the backward torque, the electromagnetic two-way clutch 36 in engaged condition is not released. Therefore, when the arithmetic process of FIG. 6 is initiated, the electromagnetic two-way clutch control signal CS is turned off to establish a condition where the armature 41 and the rotor 36*b* are not fitted under pressure by the electromagnet 36*a* as shown in FIG. 8. Then, the duty control signal DS is controlled so that the output torque of the motor/generator 2 becomes positive. With this forward torque, as shown in FIG. 5, the roller is released from the condition engaged between the cam surface of the inner ring 37 and the cylindrical surface of the outer ring 38 by rotation of the sun gear S of the planetary gear mechanism 21, namely the inner ring 37 in counterclockwise relative to the outer ring 38. As a result, wedge effect is released to release the roller 39 from engagement between the cam face of the inner ring 37 and the cylindrical surface of the outer ring 38. Then, the cage 40 is held at the neutral position where the roller 39 does not engage between the cam surface and the cylindrical surface by a not shown return spring. As a result, the pinion carrier C of the outer ring 38 and the sun gear S of the inner ring 37 are relatively rotatable. Then, as can be clear from FIGS. 4 and 5, since the inner ring 37 and the outer ring 38 are required to rotate relatively, the necessary period becomes quite short. As set forth above, this fact is detected by detecting the motor/generator speed $N_{M/G}$ higher than the engine speed $N_E$. Then, the electromagnetic two-way clutch 36 is released and thus the motor/generator 2 and the engine 1 are not directly connected.

Figure 9:
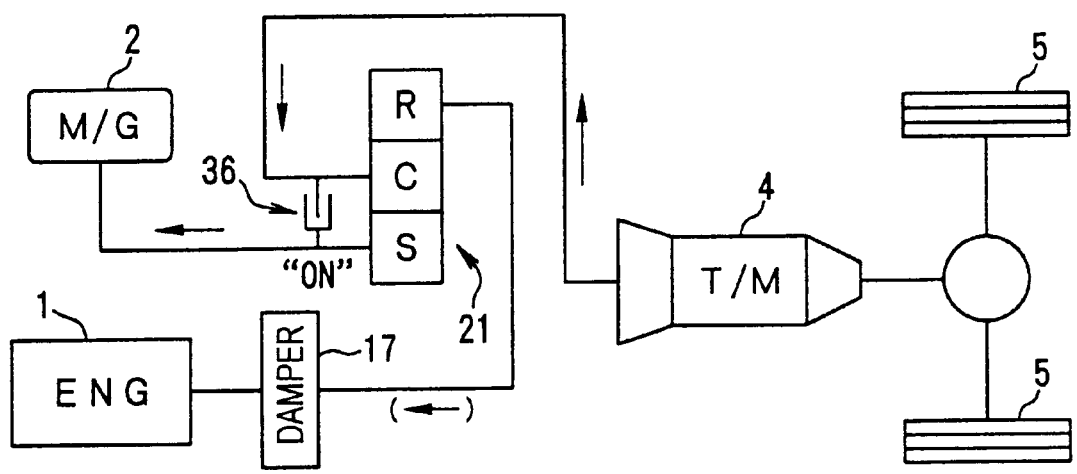
FIG. 9 is a diagrammatic and alignment charts while the parallel hybrid vehicle of FIG. 1 is maintained in decelerating condition.
Figure 9:
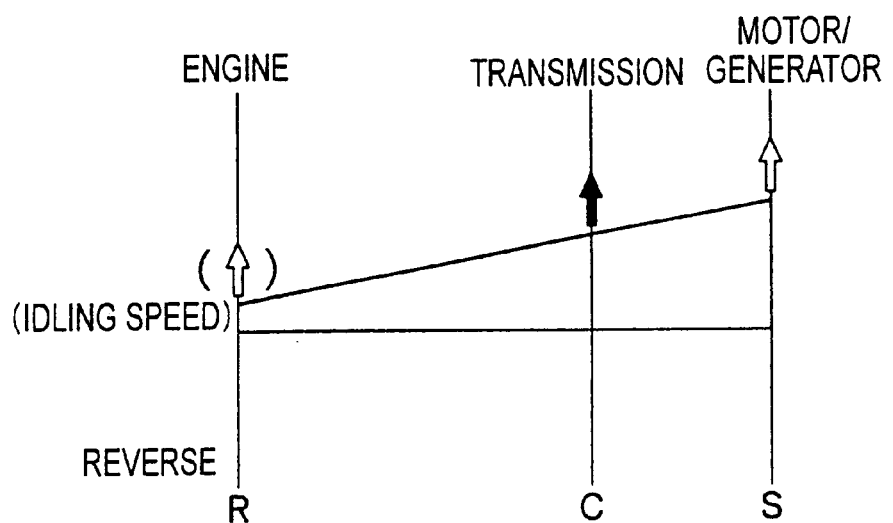

Therefore, by not shown individual arithmetic process, the motor/generator 2 is rotated in forward direction with obtaining torque in negative direction, namely to obtain regenerating torque. As shown in FIG. 9, the engine 1 reaches to the idling speed quickly, and most of backward torque from the driving wheel 5 is converted into regenerating torque of the motor/generator 2. During this period, namely while the vehicle driving mode transit to deceleration mode, and the electromagnetic two-way clutch 36 is released. Necessary period to maintain this condition is quite short as set forth above. Therefore, most of the backward torque from the driving wheel 5 can be converted into regeneration torque to achieve quite high regeneration efficiency.

Next, arithmetic process to be performed during vehicle driving condition, such bas acceleration in standstill condition to be performed in the motor/generator controller 12 will be discussed with reference to the flowchart of FIG. 10. This arithmetic process is performed by timer interrupt per every predetermined control period ΔT by the arithmetic process device 12*b* in the motor/generator controller 12. On the other, while not communication step is provided in the shown flowchart, necessary information or program is externally input or read out from the storage device 12*c* through the input interface 12*a* from time to time, and information on arithmetic operation is stored in the storage device 12*c* from time to time.

In the shown arithmetic process, at first, at step S21, according to each individual arithmetic process to be executed in the step, the throttle valve open degree TH detected by the throttle valve open degree sensor 11, the brake pedal depressing condition of the brake switch 15, the range signal RS of the inhibitor switch 10, the engine speed $N_E$ detected by the engine speed sensor 8 and the motor/generator speed $N_{M/G}$ are read out.

Next, the process is advanced to step S22, according to each individual arithmetic process to be executed in the step, the vehicle speed $V_{SP}$ and the current transmission speed ratio (transmission speed range) from the transmission controller TC can be read out.

Then, the process is advanced to step S23, according to each individual arithmetic process to be executed in the step, check is performed whether the currently performed control is driving control as initiated at step S26, or not. If the currently performed control is driving control, the process is advanced to step S24, and otherwise the process is advanced to step S25.

At step S25, according to each individual arithmetic process to be executed in the step, check is performed whether the vehicle driving motor transit from standstill condition or decelerating condition to the driving condition or not from the content, such as the throttle valve open degree is not "0" and depression of the brake pedal is released, the range signal RS is traveling range, such as drive range and increasing of the engine speed $N_E$ is continued. When the vehicle driving mode transit to the driving condition, the process is advanced to step 26, and otherwise, the process returns to the main program.

At step S26, according to each individual arithmetic process to be executed in the step, driving control is initiated. Then, the process is advanced to step S27.

On the other hand, at step S24, according to each individual arithmetic process to be executed in the step, check is performed whether the vehicle driving mode transit from the driving condition to the decelerating condition from the content, such as the throttle valve open degree TH is "0" and the brake pedal is depressed, the range signal RS represents engine brake range and the transmission signal TS represents actuation of clutch for engine braking or brake. When the vehicle driving mode transits to the decelerating condition, the process is advanced to step S28, and otherwise, the process is advanced to step S27.

At step S27, according to each individual arithmetic process to be executed in the step, revolution condition of the motor/generator 2 is set for forward rotation, and the duty control signal DS is output for further acceleration. Then, the process is advanced to step S29.

At step S29, check is made whether a difference value between the read out motor/generator speed $N_{M/G}$ and the engine speed $N_E$ falls within a range of zero to a predetermined speed $\Delta N$, or not. If the difference value falls within the range of zero to a predetermined speed $\Delta N$, the process is advanced to step S30, and otherwise, the process is advanced to step S32.

At step S30, according to each individual arithmetic process to be executed in the step, the control signal CS of the electromagnetic two-way clutch 36 is turned into ON state, namely, the electromagnet 36a of the electromagnetic two-way clutch 36 is energized. Then, the process is advanced to step S32.

At step S32, check is made whether the motor/generator speed $N_{M/G}$ and the engine speed $N_E$ are matched or not. If both are matched, the process is advanced to step S31, and otherwise, the process is returned to main program.

At step S31, according to each individual arithmetic process to be executed in the step, the control signal CS of the electromagnetic two-way clutch is turned into OFF state, namely, the electromagnet 36a of the electromagnetic two-way clutch 36 is deenergized. Then, process is advanced to step S28.

At step S28, driving control initiated at step S26 is terminated. Then, process returns to the main program.

Figure 10:
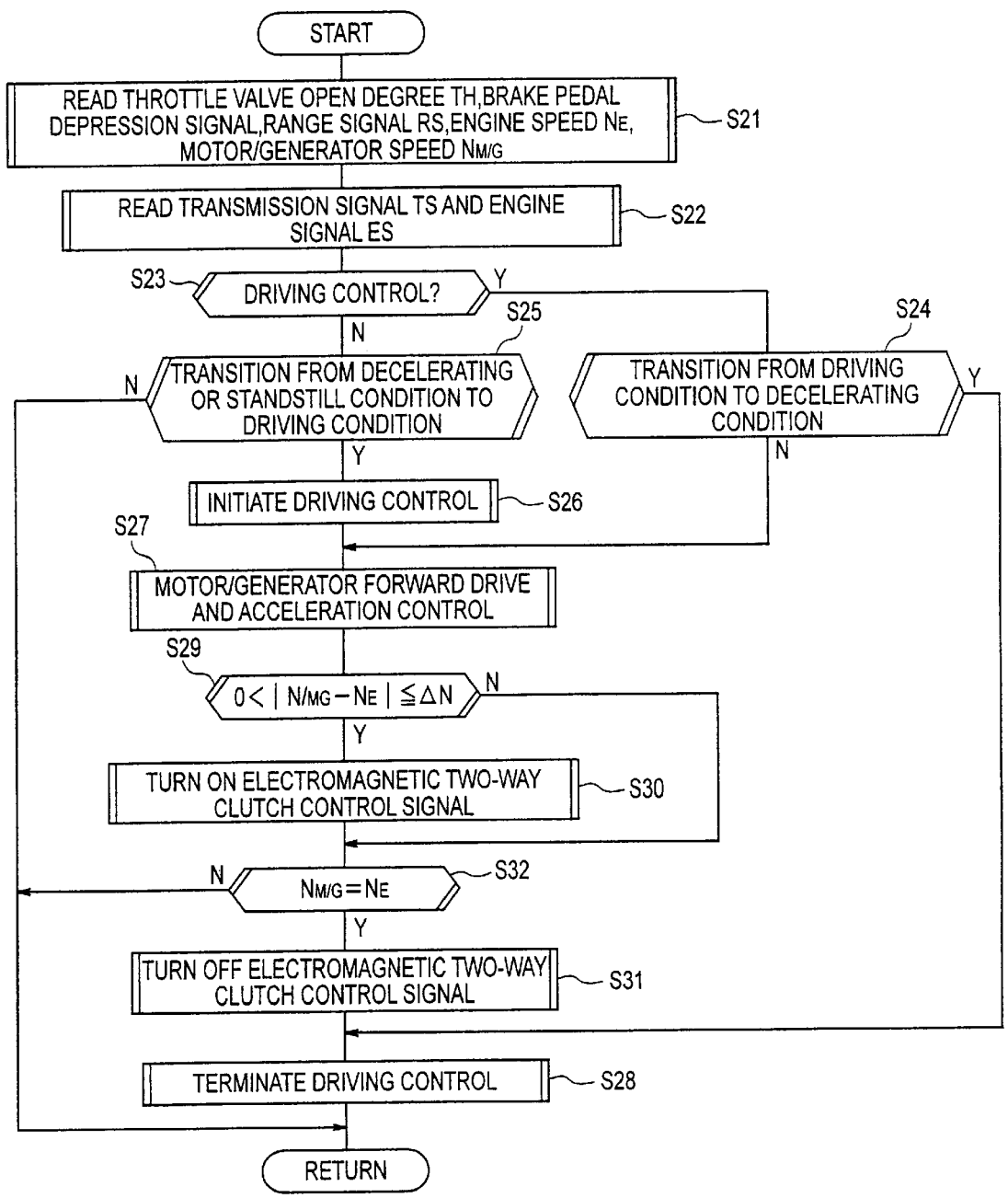
FIG. 10 is a flowchart showing an arithmetic process during driving control to be performed in a controller.

With the arithmetic process of FIG. 10, when the vehicle maintains the standstill condition or decelerating condition, the process returning to the main program from step S23 via step S25 is repeated. As can be clear from the arithmetic process of FIG. 6, while the vehicle maintains the standstill condition or decelerating condition, the electromagnetic two-way clutch control signal CS is OFF condition, the electromagnetic two-way clutch 36 is held in released condition. However, at the first control timing when the vehicle transits from the standstill condition or decelerating condition to the driving condition, the process is advanced from step S25 to step S26 to initiate drive control. Next, at step S27, the motor/generator 2 is driven in forward direction to further control for acceleration. For example, upon deceleration of he vehicle, by the arithmetic process of FIG. 6, the engine 1 is situated in idling condition to perform regenerating operation of the motor/generator 2 by the back torque from the driving wheel 5. When the vehicle speed is further lowered below the vehicle speed at the idling condition of the engine 1, the revolution of the motor/generator 2 is gradually transit to reverse rotation. On the other hand, when the vehicle stops or placed in standstill condition, when the motor/generator 2 performs power generation by the output torque of the engine in the idling condition, the motor/generator 2 is driven in reverse direction. In consideration of such case, the motor/generator 2 outputs the torque in the forward direction to make revolution direction of the forward rotation. Furthermore, the engine is accelerated to reach the idling speed.

Next, the process is advanced to step S29 to check whether the difference value of the motor/generator speed $N_{M/G}$ and the engine speed $N_E$ falls within a range of zero and the predetermined speed $\Delta N$, or not. When the difference value falls within a range of zero to the predetermined speed $\Delta N$, the process is advanced to step S30, the electromagnetic two-way clutch control signal CS is turned into OFF state and the electromagnetic two-way clutch 36 is maintained in released condition. Accordingly, the vehicle is driven by a combined force of the output torque of the engine 1 in idling condition and the output torque of the motor/generator 2 which is gradually operation for forward revolution and further accelerated.

Once the driving control is initiated, unless the vehicle is transited to the deceleration state, the process advanced from step S23 of the arithmetic process of FIG. 10 to step S27, and further advanced from step S29 to step S32, is repeated. However, for example if the difference valve of the engine speed $N_E$ of the engine 1 in idling condition and the motor/generator speed $N_{M/G}$ does not fall within the range of zero to predetermined speed $\Delta N$, the process is advanced from step S29 to step S30. Here, the electromagnetic two-way clutch control signal CS is turned into ON state. By the speed difference between the motor/generator 2 and the engine 1, the outer ring 38 of the electromagnetic two-way clutch 36 and the roller 39 maintained in the condition of FIG. 4 by drawing force of the electromagnet 36a are fixed by fitting the armature 41 on the rotor 36b secured on the outer ring 38 under pressure and by fixing the outer ring 38 and the cage 40, namely the roller 39 is engaged between the cam face of the inner ring 37 and the outer cylindrical surface of the outer ring 38 as shown in FIG. 5 to be integrated. Namely, at this timing, the motor/generator 2 and the engine 1 are directly connected.

Next, at step S28, the shown program executed in the driving condition is terminated and the process returns to the main program. On the other hand, upon transition from the driving control to deceleration state, the process is advanced from step S24 to step S28. Then the shown program is terminated and the process returns to the main program.

Next, discussion will be given for particular operation of the arithmetic process of FIG. 10.

When the driver depresses the accelerator pedal form the condition where the vehicle is held in standstill condition in idling of the engine speed, the arithmetic process of FIG. 10 transit from step S23 to S25. Then, judgment is made that the vehicle driving mode transits to the driving condition, drive control is initiated at step S26. Then, next, at step S27, forward driving and acceleration control is performed for the motor/generator 2. On the other hand, at this timing, since the motor/generator speed $N_{M/G}$ does not exceed the engine speed $N_E$, the process is advanced from step S29 to step S30 to maintain the electromagnetic two-way control signal CS in OFF condition. The electromagnetic two-way clutch 36 is maintained in released condition. As a result, the vehicle is driven by the combined force of the torque of the engine 1 in the idling condition, for example and the torque of the motor/generator 2. When vehicle speed is increase and revolution of the motor/generator 2 becomes forward direction and accelerated.

Figure 11:
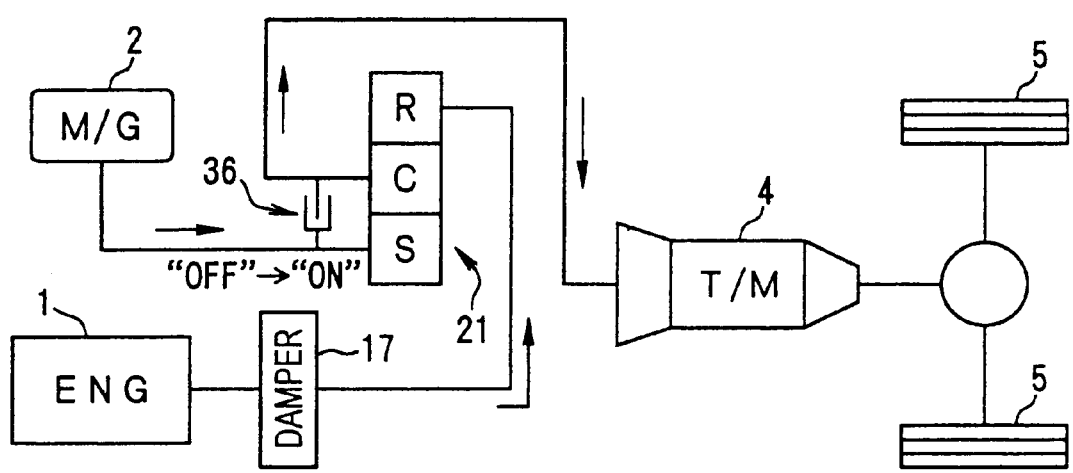
FIG. 11 is a diagrammatic and alignment charts while the parallel hybrid vehicle of FIG. 1 is in acceleration from standstill condition.
Figure 11:
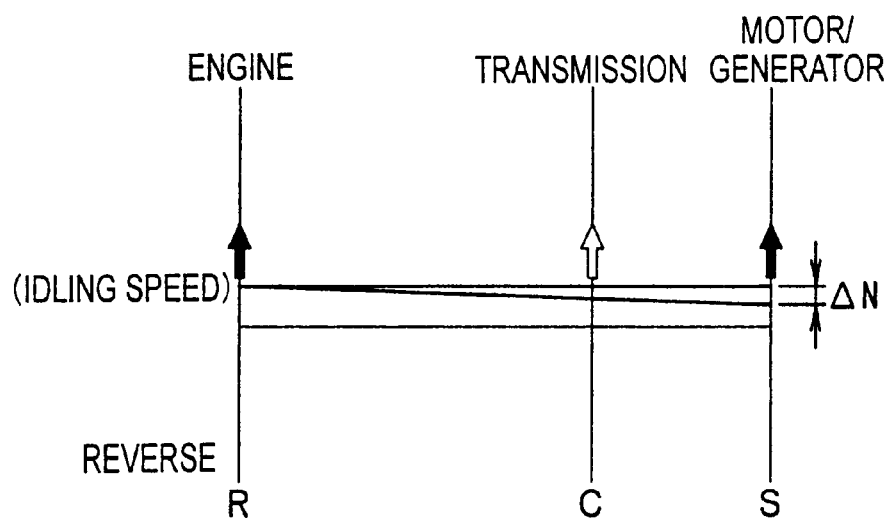

As set forth above, when the accelerated motor/generator speed $N_{M/G}$ exceeds a speed that is lower than the engine speed $N_E$ in idling condition by a predetermined speed $\Delta N$, the arithmetic process transit from the step S29 to step S30 by the process shown in FIG. 10 to turn the electromagnetic two-way clutch control signal CS into ON state. By this, the roller 39 is engaged between the cam face of the inner ring 37 and the cylindrical surface of the outer ring 38 in the condition of FIG. 5. Thus, the inner ring 37 and the outer ring 38 are integrated to engage the electromagnetic two-way clutch 36. As can be clear from FIGS. 4 and 5, since the roller 39 is required to slightly rotate relative with the inner ring 37, the necessary period for engaging the electromagnetic two-way clutch 36 becomes quite short. Immediately after this, as shown in FIG. 11, the engine 1 and the motor/generator 2 are directly connected, and the vehicle is driven by the combined force of both torques.

It should be noted that, in the foregoing embodiment, in the directly connected condition of the engine 1 and the motor/generator 2, the electromagnet 36a of the electromagnetic two-way clutch 36 is in deenergized condition. However, it is possible to place the electromagnet in energized condition to strengthen engaging condition.

On the other hand, the shown embodiment has been discussed for the case where the microcomputer is employed as the controller, various arithmetic circuit can be used in place.

As set forth above, with the parallel hybrid vehicle, by performing the electromagnetic two-way clutch mechanism is used for releasing engagement between respective element of the planetary gear mechanism as the torque combining mechanism, superior response characteristics in engagement and disengagement thereof, namely engagement and disengagement of the engine and the electric motor. Particularly, timing to perform regenerating operation of the electric motor by disengaging both can be quicken to improve regeneration efficiency. On the other hand, since it becomes unnecessary to form the fluid passage as required in the hydraulic clutch and friction plate is not required to be arranged in axial direction. Therefore, freedom in layout can be increased. At the same time, a length in the axial direction can be shortened.

On the other hand, the planetary gear mechanism as the torque combining mechanism and the motor generator are separated by the partitioning wall coupled with the transmission. The partitioning wall is reduced in diameter at the end portion on the side of the motor generator, the electromagnet of the electromagnetic two-way clutch can be arranged within the cavity defined in the reduced diameter portion, the motor generator and the electromagnet of the electromagnetic two-way clutch are placed in close proximity with each other. Particularly, wiring of both power supply lines for the motor generator and the electromagnet of the electromagnetic two-way clutch can be facilitated. Also, the length in the axial direction can be shortened.

On the other hand, the sun gear of the planetary gear mechanism of the torque combining mechanism is connected to the motor generator, the ring gear is connected to the engine, and pinion carrier is connected to the transmission to engage and disengage the sun gear and the pinion carrier of the planetary gear mechanism by the electromagnetic two-way clutch, rolling bearing, such as roller of the electromagnetic two-way clutch is arranged between the sun gear and the pinion carrier to permit placement of the electromagnetic two-way clutch close to the planetary gear mechanism. Thus, axial length can be shortened.

Also, upon transition from engaged state of the electromagnetic two-way clutch to the released or disengaged state, the electromagnet of the electromagnetic two-way clutch is deenergized. Also, by controlling the output torque of the motor generator to make the motor generator speed higher than the engine speed, the released condition of the rolling element, such as roller is not engaged between the inner ring and the outer ring can be easily established. At this time, the electromagnet can be placed in energized condition. Thus, the electromagnetic clutch can be certainly placed in released condition.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A parallel hybrid vehicle comprising:
    an engine;
    a motor generator having both functions of a generator and a motor;
    a transmission;
    a torque combining mechanism combining an output torque of said engine and an output torque of said motor generator by a planetary gear mechanism for outputting torque;
    control means for controlling output torque of said motor generator and rotating condition; and
    an electromagnetic two-way clutch mechanism selectively controlling engaging and disengaging between respective elements of said planetary gear mechanism,
    wherein said planetary gear mechanism of said torque combining mechanism and said motor generator are separated by a partitioning wall coupled with said transmission, said partitioning wall being reduced in diameter at an end portion on the side of said motor generator, an electromagnet of said electromagnetic two-way clutch is arranged on an inside of the diameter reduced end portion of said partitioning wall.

2. A parallel hybrid vehicle as set forth in claim 1, wherein a sun gear of said planetary gear mechanism of said torque combining mechanism is connected to said motor generator, a ring gear is connected to said engine, a pinion carrier is connected to said transmission, and said sun gear and said pinion carrier of said planetary gear mechanism is engaged and disengaged by said electromagnetic two-way clutch.

3. A parallel hybrid vehicle as set forth in claim 1, wherein when said electromagnetic two-way clutch is shifted from engaged position to disengaged position, said control means deenergizes said electromagnet of said electromagnetic two-way clutch and controls an output torque of said motor generator so that a revolution speed of said motor generator becomes higher than a revolution speed of the engine.

4. A parallel hybrid vehicle as set forth in claim 2, wherein when said electromagnetic two-way clutch is shifted from engaged position to disengaged position, said control means deenergizes said electromagnet of said electromagnetic two-way clutch and controls an output torque of said motor generator so that a revolution speed of said motor generator becomes higher than a revolution speed of the engine.

5. A parallel hybrid vehicle comprising:

an engine;

a motor generator having both functions of a generator and a motor;

a transmission;

a torque combining mechanism combining an output torque of said engine and an output torque of said motor generator by a planetary gear mechanism for outputting torque;

control means for controlling output torque of said motor generator and rotating condition; and an electromagnetic two-way clutch mechanism selectively controlling engaging and disengaging between respective elements of said planetary gear mechanism, wherein said electromagnetic two-way clutch mechanism comprises an inner ring connected to one element of said planetary gear mechanism, an outer ring connected to another element of said planetary gear mechanism, a rotor arranged in the outer periphery of said outer ring, a plurality of rollers disposed between said inner ring and said outer ring as a rolling element, a cage for holding said rollers, an armature connected to said cage for sliding in an axial direction but being prevented from causing angular displacement relative to said cage and extending outside of said outer ring, and an electromagnet located outside a position of said outer ring and permitted angular displacement relative to said rotor, wherein one of an inner peripheral surface of said outer ring and outer peripheral surface of said inner ring is a cylindrical surface, whereas another one of the inner peripheral surface of said outer ring and the outer peripheral surface of said inner ring has a polygonal section so that each plane forming the polygonal section serves as a cam face, and when said electromagnet is an excited position, said rotor is urged onto said armature by a magnetic force to fix the rotational direction of said outer ring or said inner ring and said cage so that said rolling element is inclined toward one of a wedge space by said cage to engage between said cylindrical surface and said cam surface to cause integral rotation of said inner ring, said outer ring and said rolling element.

6. A parallel hybrid vehicle as set forth in claim 5, wherein said planetary gear mechanism of said torque combining mechanism and said motor generator are separated by a partitioning wall coupled with said transmission, said partitioning wall being reduced in diameter at an end portion on the side of said motor generator, the electromagnet of said electromagnetic two-way clutch is arranged on an inside of the diameter reduced end portion of said partitioning wall.

7. A parallel hybrid vehicle as set forth in claim 5, wherein when said electromagnetic two-way clutch is shifted from engaged position to disengaged position, said control means deenergizes said electromagnet of said electromagnetic two-way clutch and controls an output torque of said motor generator so that a revolution speed of said motor generator becomes higher than a revolution speed of the engine.

8. A parallel hybrid vehicle as set forth in claim 6, wherein a sun gear of said planetary gear mechanism of said torque combining mechanism is connected to said motor generator, a ring gear is connected to said engine, a pinion carrier is connected to said transmission, and said sun gear and said pinion carrier of said planetary gear mechanism is engaged and disengaged by said electromagnetic two-way clutch.

9. A parallel hybrid vehicle as set forth in claim 6, wherein when said electromagnetic two-way clutch is shifted from engaged position to disengaged position, said control means deenergizes said electromagnet of said electromagnetic two-way clutch and controls an output torque of said motor generator so that a revolution speed of said motor generator becomes higher than a revolution speed of the engine.

10. A parallel hybrid vehicle as set forth in claim 8, wherein when said electromagnetic two-way clutch is shifted from engaged position to disengaged position, said control means deenergizes said electromagnet of said electromagnetic two-way clutch and controls an output torque of said motor generator so that a revolution speed of said motor generator becomes higher than a revolution speed of the engine.

* * * * *